(12) United States Patent
Hong

(10) Patent No.: US 7,054,897 B2
(45) Date of Patent: May 30, 2006

(54) TRANSPOSABLE REGISTER FILE

(75) Inventor: John Suk-Hyun Hong, San Jose, CA (US)

(73) Assignee: DSP Group, Ltd., Herzelia (IL)

( * ) Notice: Subject to any disclaimer, the term of this patent is extended or adjusted under 35 U.S.C. 154(b) by 659 days.

(21) Appl. No.: 09/970,464

(22) Filed: Oct. 3, 2001

(65) Prior Publication Data

US 2003/0084080 A1 May 1, 2003

(51) Int. Cl.
*G06F 17/14* (2006.01)

(52) U.S. Cl. .................................. 708/400

(58) Field of Classification Search ............ 708/400, 708/200, 401–410; 711/100, 200
See application file for complete search history.

(56) References Cited

U.S. PATENT DOCUMENTS

| | | | | |
|---|---|---|---|---|
| 4,760,543 A | * | 7/1988 | Ligtenberg et al. | 708/400 |
| 4,829,465 A | * | 5/1989 | Knauer | 708/402 |
| 5,129,092 A | * | 7/1992 | Wilson | 712/16 |
| 5,546,336 A | * | 8/1996 | Pechanek et al. | 708/402 |
| 5,644,517 A | * | 7/1997 | Ho | 708/401 |
| 5,875,355 A | * | 2/1999 | Sidwell et al. | 712/300 |
| 6,728,741 B1 | * | 4/2004 | Keay | 708/401 |
| 6,732,131 B1 | * | 5/2004 | Uetani | 708/402 |
| 2002/0032710 A1 | * | 3/2002 | Saulsbury et al. | |

OTHER PUBLICATIONS

Helmut et al., A transpose-register fr a 2D-FFT of 64×64 Pixel-Blocks, 1992, IEEE, pp. 294297.*

* cited by examiner

*Primary Examiner*—Kakali Chaki
*Assistant Examiner*—Chat C. Do
(74) *Attorney, Agent, or Firm*—David T. Millers

(57) ABSTRACT

A register file structure efficiently handles matrix and image processing. The register file contains an array of data elements and has modes for accessing of multiple data values that are aligned horizontally or vertically in a data array and for accessing data having different widths for each data value. The different modes allow manipulation of a transposed array without requiring a transpose operation and permit fast horizontal or vertical filtering with parallel access and multiplications of horizontally or vertically aligned data elements.

4 Claims, 2 Drawing Sheets

TRANSPOSABLE REGISTER FILE

BACKGROUND

Processors that perform image or video processing often need to manipulate arrays of image data. In particular, a typical representation of an image uses one or more arrays of pixel values or transformed coefficients in time or frequency domain. These arrays are commonly manipulated for encoding or decoding of compressed image data and for filtering or changing of the image.

Matrix operations are common techniques used in image processing. For example, a DCT transformation, which transforms the image array from space domain to frequency domain, normally requires a transpose operation after a one-dimensional DCT operation. Conventionally, a transpose operation requires reading individual values from an array and storing the values in the correct positions in a transposed array. The number of cycles require to transpose an array generally depends on the number of values in the array.

Another common operation in image processing is filtering. For example, a linear filtering operation accesses a series of values, multiplies the values by respective filter coefficient, and sums the resulting products. Some video or image processors provide parallel data processing that permits parallel multiplications of multiple values and respective filter coefficients. However, memories and register files in such systems generally only allow simultaneous access to a set of values aligned along a particular direction, i.e., along a row of the array. Accordingly, a single instruction can access multiple values for a horizontal filtering operation, but vertical filtering requires either transposing the array being filtered or performing separate access operations for each value in a different row.

In view of these limitations of current image and video processors, more efficient architectures and methods for performing transpose and other array manipulations are desired.

SUMMARY

In accordance with an aspect of the invention, a register file or other memory that contains an array of data elements and a port that permits simultaneous access to multiple data elements is operable in a first mode for simultaneous accesses of data elements that are horizontally aligned in the array and a second mode for simultaneous accesses of data elements that are vertically aligned in the array. A data array can be stored in the register file such that the first mode provides access to a row of values in the data array and the second mode provides access to a column of values in the data array. When processing operates on the transpose of the array, a transpose operation can be avoided by using second mode for row accesses and the first mode for column accesses of the transposed array.

The two access modes also permit fast horizontal and vertical filter operations because the access modes respectively provide parallel access to horizontally aligned data and parallel access to vertically aligned data.

One specific embodiment of the invention is a memory structure such as a register file that includes an array of data elements and associated access circuitry. The access circuitry is operable in a normal mode and a transpose mode. The normal mode provides parallel access to a set of data elements containing data values that are horizontally aligned. The transpose mode provides parallel access to data elements containing multiple data values that are vertically aligned. The access circuitry has further operational modes for parallel access of data values having different widths and/or differing in number, e.g., half as many data values having twice the width.

One embodiment of the access circuitry includes a data path and an array of multiplexing circuits. The data path has a width sufficient for simultaneous access to the multiple data values. The multiplexing circuits are connected to respective data elements, and each multiplexing circuit connects the associated data element to a portion of the data path that is selected according the operating mode of the memory. In the normal mode, the data elements that the array of multiplexing circuits connects for access via the data path contain data values that are horizontally aligned. In transpose mode, the data elements that the array of multiplexing circuits connects for access via the data path contain data values that are vertically aligned.

The access circuitry can further include an address decoder and multiple sets of enable lines. A first set of enable lines is coupled to enable a set of data elements corresponding to data that is horizontally aligned. A second set of enable lines is coupled to enable a set of data elements corresponding to data that is vertically aligned. In the normal mode, the address decoder activates one of the enable lines in the first set. In the transpose mode, the address decoder activates one of the enable lines corresponding in the second set.

Another embodiment of the invention is a method for operating a processor. The method includes storing an array of data values in a register file and setting an operating mode of the processor to select between a normal mode and a transpose mode of a port of the register file. The alignment of multiple accessible data values in the register file depends on the operating mode. In particular, when the operating mode is the normal mode, the data values accessed (i.e., read or written) are horizontally aligned, and when the operating mode is the transpose mode, the data values accessed are vertically aligned.

Simultaneously accessing multiple data values from the register file can include selecting between or among alternative connections of the data elements to a data path in the register file. The selection is according to the operating mode and the decoding of an address signal that identifies the multiple data values for simultaneous access.

BRIEF DESCRIPTION OF THE DRAWINGS

Use of the same reference symbols in different figures indicates similar or identical items.

DETAILED DESCRIPTION

In accordance with an aspect of the invention a register file or memory structure includes an array of data elements connected to a data path that permits parallel access of multiple data elements. Accesses can be conducted several modes. A normal mode provides access to multiple data elements that are horizontally aligned. A transpose mode provides access to data elements that are vertically aligned. In accordance with a further aspect of the invention, a size mode selection of the register file selects the size for the data elements, e.g., 8-bit or 16-bit data elements.

Figure 1:
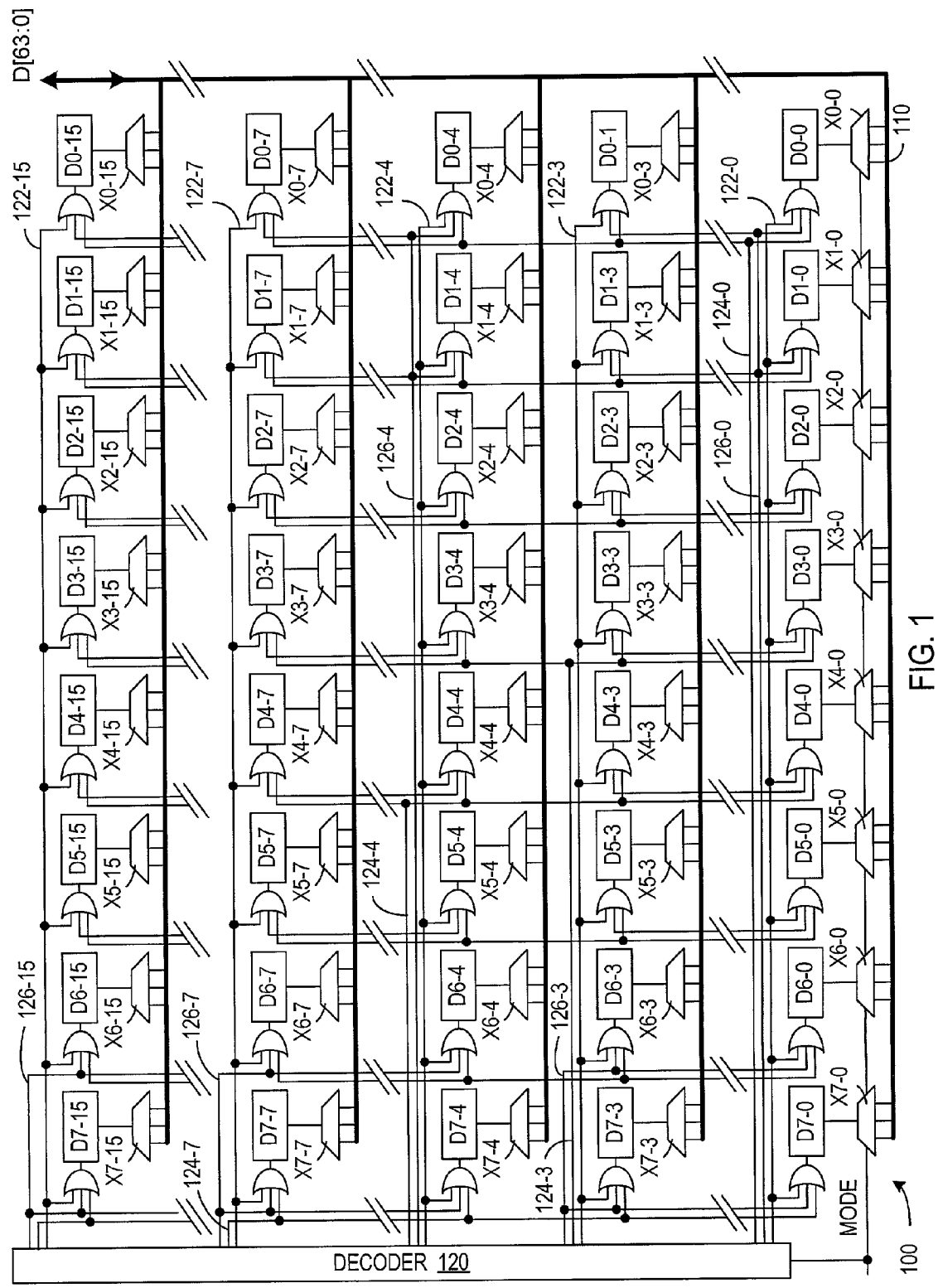
FIG. 1 illustrates a portion of a register file in accordance with an embodiment of the invention.

FIG. 1 illustrates a register file 100 that can be used as a register file in a processor or more generally as a memory in any device where transpose capabilities are desired. Register file 100 is particularly suited for processors with image processing and parallel processing capabilities such as described in U.S. patent application Ser. No. 09/186,725, entitled "Multipurpose Processor for Motion Estimation, Pixel Processing, and General Processing"; U.S. patent application Ser. No. 09/874,525, entitled "Multiplier Capable of Multiplication of Large Multiplicands and Parallel Multiplications of Small Multiplicands"; and U.S. patent application Ser. No. 09/816,857, entitled "Quantization Device and Method Using Prime Number Dividers," which are hereby incorporated by reference in their entirety.

Register file 100 as shown in FIG. 1 includes an array of data elements D0-0 to D7-15, an array of multiplexing circuits X0-0 to X7-15, a data bus 110, and an address decoder 120. In the embodiment of FIG. 1, data elements D0-0 are logically arranged in sixteen rows and eight columns. Each data element D0-0 to D7-15 provides storage for eight bits of information and can be any type of digital data storage such as Flip-Flops, SRAM, or DRAM. Data bus 110 and a data port of register file 100 are 64 bits wide to permit simultaneous access to eight data elements D0-0 to D7-16. As will be apparent to those skilled in the art, the arrangement of FIG. 1 is merely an example of a memory size; and the number of rows and columns of data elements, the storage capacities of each data element, and data path widths can be varied widely in alternative embodiments of the invention.

Register file 100 has multiple access modes and operates in the access mode that a control signal MODE identifies. Signal MODE can be generated from a configuration register (not shown) for register file 100 or from an instruction being executed in a processor containing register file 100. In the exemplary embodiment of FIG. 1, control signal MODE is a 2-bit signal having a first bit that designates either normal mode or transpose mode and a second bit that designates either 8-bit mode or 16-bit mode for data access.

Address decoder 120 decodes an address signal ADDR and in the embodiment illustrated in FIG. 1, activates a set of eight data elements corresponding to the address and current access mode. Address decoder 120 can be implemented as a standard address decoder with additional multiplexing circuitry (not shown) that connects activated lines to one of three sets of enable lines 122-0 to 122-15, 124-0 to 124-15, and 126-0 to 126-15. In 8-bit or 16-bit normal mode, address decoder 120 activates one of lines 122-0 to 122-15 to select a row of data elements containing eight horizontally aligned 8-bit values or four horizontally aligned 16-bit values. In 8-bit transpose mode, address decoder 120 activates one of lines 124-0 to 124-15 to select eight vertically aligned 8-bit values. In 16-bit transpose mode, decoder 120 activates one of lines 126-0 to 126-15 to select four vertically aligned 16-bit values, each 16-bit value having bytes in neighboring columns of register file 100.

Data elements D0-0 to D7-15 are coupled to data bus 110 through respective multiplexing circuits X0-0 to X7-15. Multiplexing circuits X0-0 through X7-15, which are under the control of signal MODE, select which of the 64 bits of data bus 110 are connected to the eight bits associated with the respective memory element D0-0 to D7-15.

In the normal mode, multiplexing circuits X0-0 to X7-15 operate to connect data elements D0-i to D7-i in each row i to 8-bit sections of data bus 110 in order of increasing bit number as shown in Table 1.

TABLE 1

Data Bits Assigned to Data Elements in 8-bit or 16-bit Normal Modes

| ADDR | DATA | | | | | | | |
|---|---|---|---|---|---|---|---|---|
| | D[63:56] | D[55:48] | D[47:40] | D[39:32] | D[31:24] | D[23:16] | D[15:8] | D[7:0] |
| 0 | D7-0 | D6-0 | D5-0 | D4-0 | D3-0 | D2-0 | D1-0 | D0-0 |
| 1 | D7-1 | D6-1 | D5-1 | D4-1 | D3-1 | D2-1 | D1-1 | D0-1 |
| 2 | D7-2 | D6-2 | D5-2 | D4-2 | D3-2 | D2-2 | D1-2 | D0-2 |
| ... | ... | ... | ... | ... | ... | ... | ... | ... |
| 15 | D7-15 | D6-15 | D5-15 | D4-15 | D3-15 | D2-15 | D1-15 | D0-15 |

In normal mode for both 8-bit and 16-bit modes, address decoder 120 decodes address signal ADDR and activates one of lines 122-0 to 122-15 to enable the memory elements in the row corresponding to the address signal. Accordingly, address decoder 120 enables data elements in the selected row to output data to the data bus 110 for a read operation or receive and store data from bus 110 for a write operation. The data port associated with data bus 110 outputs or inputs a 64-bit data signal D[63:0] for read or write operations.

In the transpose mode, register file 100 outputs different data depending on whether register file 100 is in 8-bit mode or 16-bit mode. In 8-bit transpose mode, multiplexing circuits X0-0 to X7-15 connect sets of eight vertically aligned data elements Di-0 to Di-7 and Di-8 to Di-15 in each column i to 8-bit sections of data bus 110 as shown in Table 2.

TABLE 2

Data Bits Assigned to Data Elements in 8-bit Transpose Mode

| ADDR | DATA | | | | | | | |
|---|---|---|---|---|---|---|---|---|
| | D[63:56] | D[55:48] | D[47:40] | D[39:32] | D[31:24] | D[23:16] | D[15:8] | D[7:0] |
| 0 | D0-7 | D0-6 | D0-5 | D0-4 | D0-3 | D0-2 | D0-1 | D0-0 |
| 1 | D1-7 | D1-6 | D1-5 | D1-4 | D1-3 | D1-2 | D1-1 | D1-0 |

TABLE 2-continued

Data Bits Assigned to Data Elements in 8-bit Transpose Mode

| | DATA | | | | | | | |
|---|---|---|---|---|---|---|---|---|
| ADDR | D[63:56] | D[55:48] | D[47:40] | D[39:32] | D[31:24] | D[23:16] | D[15:8] | D[7:0] |
| 2 | D2-7 | D2-6 | D2-5 | D2-4 | D2-3 | D2-2 | D2-1 | D2-0 |
| ... | | | | | | | | |
| 7 | D7-7 | D7-6 | D7-5 | D7-4 | D7-3 | D7-2 | D7-1 | D7-0 |
| 8 | D0-15 | D0-14 | D0-13 | D0-12 | D0-11 | D0-10 | D0-9 | D0-8 |
| 9 | D1-15 | D1-14 | D1-13 | D1-12 | D1-11 | D1-10 | D1-9 | D1-8 |
| ... | | | | | | | | |
| 15 | D7-15 | D7-14 | D7-13 | D7-12 | D7-11 | D7-10 | D7-9 | D7-8 |

In the 8-bit transpose mode, address decoder 120 identifies a selected column and a selected set of eight data elements in the selected column from address signal ADDR. Decoder 120 enables one of lines 124-0 to 124-15 to select eight vertically aligned data elements for access via data bus 110.

Sixteen-bit mode uses two 8-bit data elements in adjacent columns to form a 16-bit data element. Accordingly, in 16-bit transpose mode, multiplexing circuits X0-0 to X7-15 connect sets of eight data elements D2i-0 to D2i-3 and D(2i+1)-0 to D(2i+1)-3, D2i-4 to D2i-7 and D(2i+1)-4 to D(2i+1)-7, D2i-8 to D2i-11 and D(2I+1)-8 to D(2i+1)-11, and D2i-12 to D2i-15 and D(2i+1)-12 to D(2i+1)-15 for i equal to 0, 1, 2, and 3 to data bus 110 as shown in Table 3.

TABLE 3

Data Bits Assigned to Data Elements in 16-bit Transpose Mode

| | DATA | | | | | | | |
|---|---|---|---|---|---|---|---|---|
| ADDR | D[63:56] | D[55:48] | D[47:40] | D[39:32] | D[31:24] | D[23:16] | D[15:8] | D[7:0] |
| 0 | D1-3 | D0-3 | D1-2 | D0-2 | D1-1 | D0-1 | D1-0 | D0-0 |
| 1 | D3-3 | D2-3 | D3-2 | D2-2 | D3-1 | D2-1 | D3-0 | D2-0 |
| 2 | D5-3 | D4-3 | D5-2 | D4-2 | D5-1 | D4-1 | D5-0 | D4-0 |
| 3 | D7-3 | D6-3 | D7-2 | D6-2 | D7-1 | D6-1 | D7-0 | D6-0 |
| 4 | D1-7 | D0-7 | D1-6 | D0-6 | D1-5 | D0-5 | D1-4 | D0-4 |
| 5 | D3-7 | D2-7 | D3-6 | D2-6 | D3-5 | D2-5 | D3-4 | D2-4 |
| 15 | D7-15 | D6-15 | D7-14 | D6-14 | D7-13 | D6-13 | D7-12 | D6-12 |

Address decoder 120 enables one of lines 126-0 to 126-15 to select four vertically aligned 16-bit data elements (e.g., a 4×2 set of 8-bit data elements) for access through data bus 110.

Figure 2:
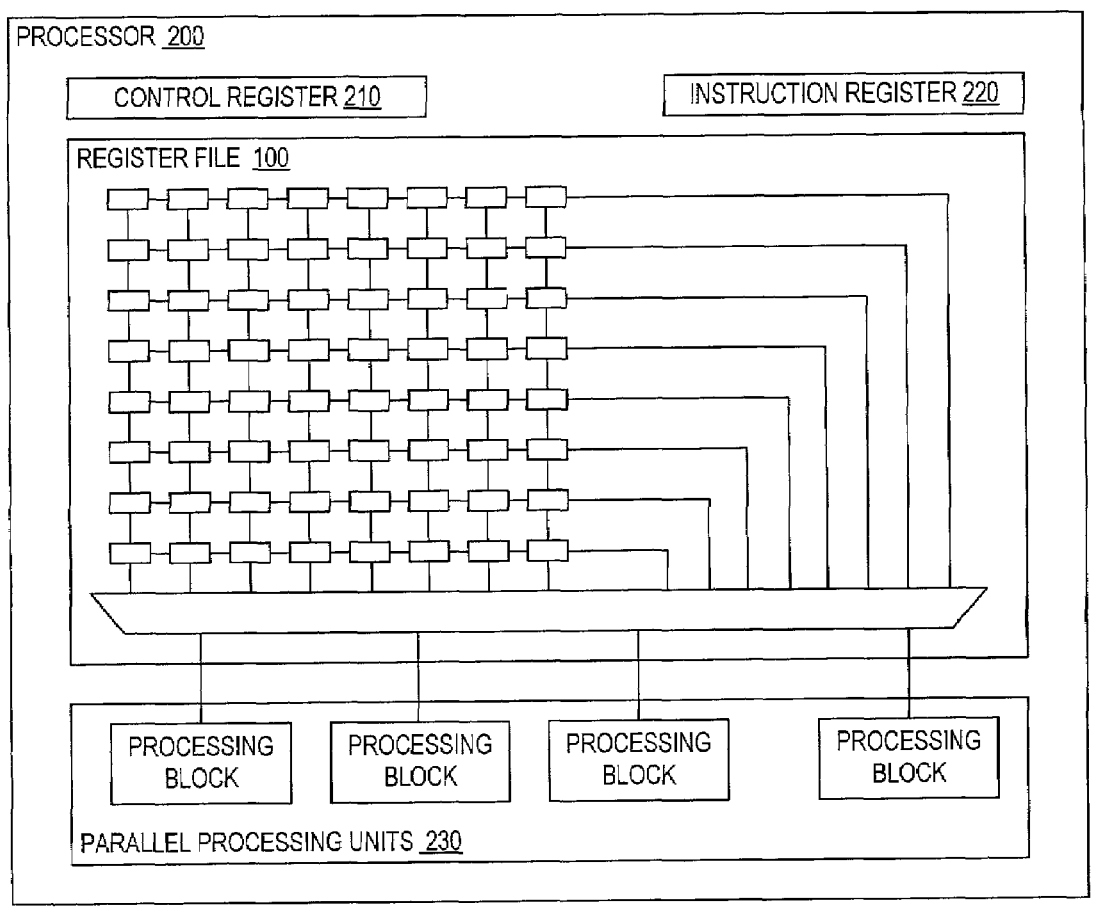
FIG. 2 is a block diagram of a processor 200 in accordance with an embodiment of the invention.

FIG. 2 illustrates a processor 200 in accordance with an embodiment of the invention. Processor 200 includes a register file 100 that operates in normal and transpose modes as described above. Processor 200 also includes a control register 210, an instruction register 220, and parallel processing units 230.

Control register 210 contains control and status information for and regarding the operation of processor 200. In particular, control register 210 can contain a value indicating whether processor 200 is operating in normal or transpose mode and 8-bit or 16-bit mode.

Instruction register 220 contains an instruction for processor 200 to execute and in particular can provide a register number identifying the address of data in register file 100. The instruction also controls the operation that parallel processing units 230 perform. In accordance, with a further aspect of the invention, the instruction can designate or set the operating mode of register file 100 for the access performed during execution of the instruction.

Parallel processing units 230 operate in parallel to perform separate operations on data values from register file 100. As noted above, parallel processing can simultaneously operate on 8-bit or 16-bit data values that are horizontally aligned or vertically aligned depending on the operating mode of register file 100. Accordingly, processor 200 can quickly perform horizontal and vertical filtering operations.

As will be apparent in view of the above disclosure, register file 100 can be varied in a variety of ways without departing from the spirit of the present invention. In particular, the structure of FIG. 1 includes an 8×8 array of data elements D0-0 to D7-7 having a structure that is largely repeated in a second 8×8 set of data elements D0-8 to D7-15. This structure can be generalized to include an n×n array of data elements that can be repeated any desired number of times to create a register file or memory structure of any desired size.

Additionally, FIG. 1 illustrates an embodiment with a single bi-directional data port. Alternatively, a read port and a write port can be separated to permit reading (or writing) transposed data while writing (or reading) non-transposed data. Additionally, the register file can further include one or more additional data ports that are read, write, or bi-direction ports with or without the capability for normal or transposed accesses.

Various further adaptations and combinations of features of the embodiments disclosed are within the scope of the invention as defined by the following claims.

What is claimed is:

1. A memory structure comprising:
   an array of data elements; and
   access circuitry, wherein the access circuitry is operable in
   a first mode that provides parallel access to a set of data elements that are horizontally aligned in the array; in a second mode that provides parallel access to a set of data elements that are vertically aligned in the array; in a third mode that provides parallel access to a set of data elements that are horizontally aligned, and in a fourth mode that provides parallel access to a set of data elements that are vertically aligned, the data elements accessed in the third and fourth modes having data widths that differ from data widths of the data elements accessed in the first and second modes respectively, the access circuitry comprising:

first enable lines, each first enable line being coupled to enable a set of data elements that are horizontally aligned in the array; and second enable lines, each second enable line being coupled to enable a set of data elements that are vertically aligned in the array, and third enable lines, each third enable line being coupled to enable a first set of data elements that are vertically aligned in the array and to enable a second set of data elements that are vertically aligned in the array, and an address decoder connected to the first, second, and third enable lines, wherein in the first and third modes, the address decoder activates one of the first enable lines corresponding to an address signal;

in the second mode, the address decoder activates one of the second enable lines corresponding to the address signal; and in the fourth mode, the address decoder activates one of the third enable lines corresponding to the address signal.

2. The structure of claim 1, wherein the access circuitry further comprises:

a data path having a width sufficient for simultaneous access to multiple data elements in the array; and an array of multiplexing circuits connected to respective data elements in the array of data elements, each multiplexing circuit acting to connect the associated data element to a portion of the data path that is selected according to the mode in which the memory is operating.

3. The structure of claim 2, wherein the array of multiplexing circuits collectively connects the data path to a set of the data elements that are enabled for access via the data path, wherein in the first and third modes, the set of data elements that the array of multiplexing circuits connects for access via the data path are horizontally aligned in the array;

in the second mode, the set of data elements that the array of multiplexing circuits connects for access via the data path are vertically aligned in the array; and in the fourth mode, the set of data elements that the array of multiplexing circuits connects for access via the data path includes a first set of data elements that are vertically aligned in the array and a second set of data elements that are vertically aligned in the array.

4. The structure of claim 1, wherein the memory structure is a register file of a processor.

\* \* \* \* \*